(12) United States Patent
Esders et al.

(10) Patent No.: US 8,095,926 B2
(45) Date of Patent: Jan. 10, 2012

(54) METHOD FOR THE INSTALLATION OF A PROGRAM COMPONENT

(75) Inventors: Erich Esders, Giesen (DE); Michael Uelschen, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 1060 days.

(21) Appl. No.: 10/570,469

(22) PCT Filed: Aug. 25, 2004

(86) PCT No.: PCT/EP2004/051894
§ 371 (c)(1),
(2), (4) Date: Apr. 26, 2007

(87) PCT Pub. No.: WO2005/022382
PCT Pub. Date: Mar. 10, 2005

(65) Prior Publication Data
US 2007/0234352 A1    Oct. 4, 2007

(30) Foreign Application Priority Data
Sep. 2, 2003   (DE) .................... 103 40 372

(51) Int. Cl.
*G06F 9/44* (2006.01)
*G06F 9/445* (2006.01)
(52) U.S. Cl. ......... 717/175; 717/169; 717/173; 717/178
(58) Field of Classification Search .......... 717/168–178; 709/220–223
See application file for complete search history.

(56) References Cited

U.S. PATENT DOCUMENTS

| | | | |
|---|---|---|---|
| 6,023,727 A * | 2/2000 | Barrett et al. | 709/221 |
| 6,487,723 B1 * | 11/2002 | MacInnis | 725/132 |
| 6,820,259 B1 * | 11/2004 | Kawamata et al. | 717/173 |
| 6,971,093 B1 * | 11/2005 | Spring | 717/170 |
| 7,793,280 B2 * | 9/2010 | De Boer et al. | 717/169 |
| 2002/0184499 A1 * | 12/2002 | Taguchi et al. | 713/168 |
| 2003/0088684 A1 * | 5/2003 | Fisher | 709/230 |

FOREIGN PATENT DOCUMENTS
EP    0498130    8/1992
EP    1 160 665    12/2001
* cited by examiner

*Primary Examiner* — Li Zhen
*Assistant Examiner* — Ryan Coyer
(74) *Attorney, Agent, or Firm* — Kenyon & Kenyon LLP

(57) ABSTRACT

A method for the installation of a program component on a processing unit, which is used to ensure the compatibility of software units and components in embedded systems in particular, which may be updated via a downloading procedure. For this purpose, it is checked before the installation whether the program component to be installed is compatible with a program component already provided on the processing unit. An installation is only performed in the event of a positive check of the compatibility.

7 Claims, 2 Drawing Sheets

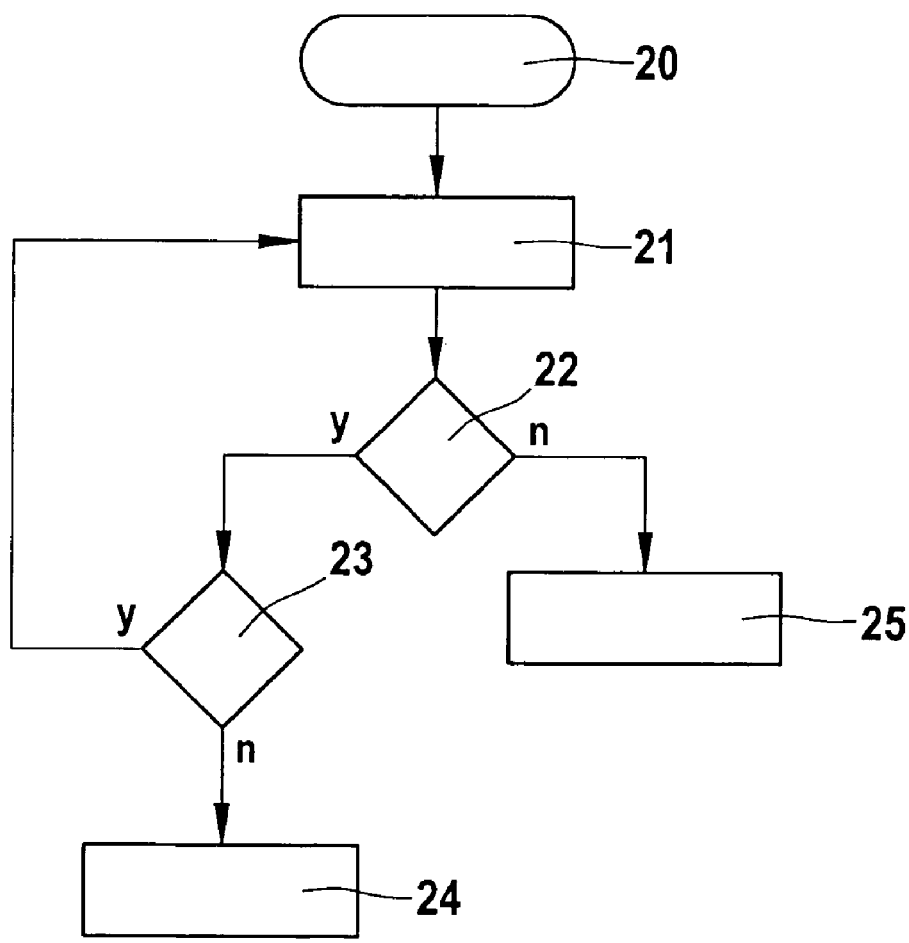

METHOD FOR THE INSTALLATION OF A PROGRAM COMPONENT

BACKGROUND INFORMATION

It is known to implement processing units in such a way that specific program components may be installed later or replaced by newer versions of the particular program component. It is also known to check whether the components to be installed are already on the processing unit in the appropriate version before the installation, in order to avoid unnecessary installation outlay.

SUMMARY OF THE INVENTION

The method according to the present invention for the installation of a program component has the advantage in relation thereto that the compatibility of a program component with program components already on the processing unit is additionally checked before input. In this way, an unnecessary installation procedure is avoided, since the installed software is not executable in the event of incompatibility with other program components. Furthermore, an executable version of a program component is prevented from being overwritten by a non-executable version. In addition, it is ensured that the processing unit is still able to run after installation of the program components. Compatibility is to be understood for this purpose as meaning that the software component which is present and remains unchanged in the device is executable together with the newly installed program component. Two components are considered compatible with one another in particular if all of their interfaces are compatible with one another. Executability is to be understood as meaning that a previously defined functionality is also provided by the processing unit after the installation of a component. The functionality may possibly be more extensive, but may also be more restricted in relation to the original functional status due to the installation of the further program components.

It is particularly advantageous to ascertain compatibility of two program components by checking the compatibility of the individual interfaces of the program components. In this way, for example, examination of the code of the individual program components may be dispensed with. The compatibility check is simplified in this way.

Furthermore, it is advantageous to determine compatibility of program components by comparing version identification numbers assigned to the program components. A comparison of two program components is then reduced to a comparison of version identification numbers and thus further simplified. In particular, a more rapid comparison is possible in this way, only a minimum amount of operating memory being necessary. A significant time savings is achieved in particular in relation to a comparison in which the compatibility of the individual interfaces is checked per se in each case. It is particularly advantageous to derive a version identification number of a program component from the interface configuration of the program component and thus assign a version identification number to a program component as a function of its interface configuration. Furthermore, it is particularly advantageous to assign lists having version identification numbers to the individual program components, from which the corresponding versions, with which the particular program component is compatible, may be seen. Since future program components are possibly unknown during an update, it is also advantageous to only require as a criterion for compatibility that one of the two program components already be contained in a list of the particular other program component. The program component itself must then no longer include an indication of the other program component in order to establish compatibility. The method is advantageous in particular if the individual program components have multiple independent interfaces, the program components accessing the interfaces mutually. It is also advantageous to install the program component to be installed to replace a program component already present on the processing unit. The installation according to the present invention only in the event of existing compatibility ensures that a dataset of an originally installed program component, which is possibly no longer available, is not replaced by a program component which is not executable with the remaining program components. The method according to the present invention allows a compatibility check to be performed when a program component is replaced by a newer version and, in addition, when a program component is replaced by an older version.

It is also advantageous to perform a compatibility check in each case during the installation in the event of installation of application programs, which are possibly updated more often.

If the installation is not performed, an error message is advantageously output which notifies the user that the installation was not performed.

The method according to the present invention may be used for any processing unit and therefore for any technical device having a processing unit. The use of the method according to the present invention is particularly advantageous in a motor vehicle which has a processing unit having embedded systems incorporated therein. Since programs are typically developed more rapidly than a motor vehicle is replaced, a later installation of program components may be performed securely using the method according to the present invention in particular, without a user running the danger of the vehicle no longer functioning afterwards or, for example, in the event of a malfunction occurring on location, data which is no longer available being overwritten by an incorrect installation.

BRIEF DESCRIPTION OF THE DRAWINGS

FIG. 3 shows a sequence of a method according to the present invention for the installation of a program component on a processing unit.

DETAILED DESCRIPTION

The present invention is subsequently explained using the example of a driver information device in a vehicle. The method is correspondingly transferable to any other processing unit.

Figure 1:
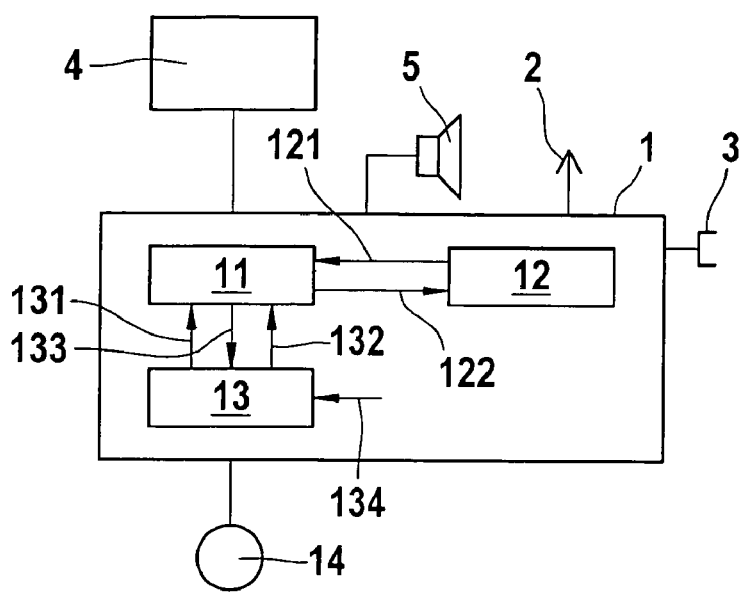
FIG. 1 shows a driver information device in a vehicle having different installed program components.

FIG. 1 shows a processing unit 1, on which a first program component 11, a second program component 12, and a third program component 13 are installed. The program components interact in that they have interfaces implemented in software, in which data and parameters are transmitted from one program component to, another program component. The individual interfaces are each implemented unidirectionally, multiple individual interfaces being able to be provided between two program components.

These multiple interfaces may be oriented unidirectionally overall in this case, but they may also permit data transmission in both directions. A first interface 131 and a second interface 132 are provided between third program component 13 and first program component 11, via which data may be transferred from third program component 13 to first program component 11. Furthermore, a third interface 133 is provided, via which data may be transmitted from first program component 11 to third program component 13. Furthermore, a first interface 121 is provided between first program component 11 and second program component 12, which is used for the purpose of transmitting data from second program component 12 to first program component 11. A second interface 122 is used for data transport in the reverse direction. Program components 11, 12, 13 are executed by a processor unit (not shown in FIG. 1) of processing unit 1.

The interfaces may also include function calls, for example, which, for an execution of the function by the particular other program component, require a specific parameter set, which is necessary for the processing of the function in the other program component.

The program components are stored in a memory (not shown in FIG. 1), assigned to processing unit 1, for the execution of the program components. The memory may be a magnetic memory, e.g., a hard drive, but may also be implemented as an overwritable memory location, e.g., an EEPROM. Installation of the program components may be understood solely as the copying of data into the memory of the processing unit. In addition, it is also possible for the installed program components to be integrated into an operating system installed on processing unit 1, i.e., an operating program for providing the basic functions of the processing unit. For this purpose, it is necessary, for example, for system files to be transmitted to processing unit 1, in addition to the program component. Furthermore, it is also possible for registry data for administering the program components to be transmitted to processing unit 1.

Processing unit 1 is implemented as a navigation device in a vehicle in the exemplary embodiment shown here. The first program component is used in this case as an operating system for the processing unit, which may assume additional functions and whose program components are also stored in processing unit 1, but are not shown in FIG. 1. Second program component 12 is used, for example, as a route calculation function, while the third program component contains a data provision function of street map data and multimedia data. It is probable that both the route calculation function and also the data provision function will change during the use of the processing unit, i.e., during the service life of the vehicle. Reasons for this may be expanded data to be provided, in which the tourism information functions are expanded, for example. Furthermore, it is also possible for an optimized route determination algorithm to be available, which may either determine a route to be driven more rapidly or, for example, is capable of incorporating the current traffic situation into the route calculation, if this was previously not the case.

If a user now wishes to install a new program component of this type on processing unit 1, various installation possibilities are provided for this purpose, which may each be implemented exclusively on a processing unit, or may be selected. In a first embodiment, the processing unit has an air interface 2, which represents the interface to a data network or to a mobile radio network, for example. The data of the program component is provided to processing unit 1 via the air interface. Furthermore, a wireless transmission from a computer in the vehicle is also possible, e.g., via a Bluetooth interface. Furthermore, processing unit 1 has a plug-in contact 3 for connecting a further computer, from which the data may be transmitted. In a further embodiment, processing unit 1 has a data carrier drive 14, in which a data carrier having a corresponding updated software component may be inserted for installation.

During the installation, it is possible for a new, additional program component to be installed in processing unit 1. For this purpose, for example, third program component 13 may have a fourth interface 134, which is still open in the illustration in FIG. 1, but to which a further program component to be installed may be appended. In a preferred embodiment, an already existing program component, e.g., the second program component, for route calculation function 12, is replaced by a newly installed program component during the installation.

An installation of a program component of this type is shown in FIG. 3. Starting from an initialization step 20, via which an installation is started, both a version identification number of a component already installed on processing unit 1 and also a version identification number of the component to be installed are determined in a determination step 21. This version identification number is determined by assigning a new version identification number upon every change of an interface configuration of a particular program component. The version identification number is possible by simply reading out a corresponding parameter value of the particular program component. Furthermore, a list of each program component connectable thereto is assigned to each program component, each of which has all version identification numbers of the versions of the other program component compatible with the program component. In a subsequent first test step 22, it is checked whether the version identification number of the component to be installed is in a list of the component already present on the processing unit or whether the version identification number of the component present on the computer is in the list of the component to be installed. If one of these two conditions has already been fulfilled, the compatibility of the two program components with one another is ensured. In this case, the sequence branches further to a second test step 23, in which it is checked whether the component to be installed must be compatible with further program components already present on the computer in addition to this first program component. This would be the case according to the exemplary embodiment of FIG. 1, for example, if first program component 11 were to be replaced by a newer version, since this interacts both with second program component 12 and also with third program component 13. In this case, the sequence branches back to determination step 21, and the same comparison between the program component to be installed and the further program component already present on the computer is performed. If there are no further program components to be checked, the sequence branches to an installation step 24, in which the program component to be installed is transmitted into the memory of processing unit 1, the program component already there either being overwritten or at least being removed from the execution of the program.

If it is ascertained in first test step 22 that the component to be installed is not compatible with a component already present in processing unit 1, the sequence branches to an abort step 25 and an acoustic and/or visual warning signal is output to a user via a display 4 or via a loudspeaker 5 of processing unit 1. It is indicated that an installation has not been performed. It is preferably also communicated which software status is necessary for an installation.

If an installation is more extensive, it may possibly be necessary to install specific components in a predefined sequence in such a way that only program components compatible with one another are on the processing unit. For example, if first and second program components 11, 12 are to be replaced, it may be necessary to first install a new version of the first program component and then a new version of the second program component, since the new second program component to be installed may possibly not be compatible with first program component 11 already present on the processing unit.

Figure 2A:
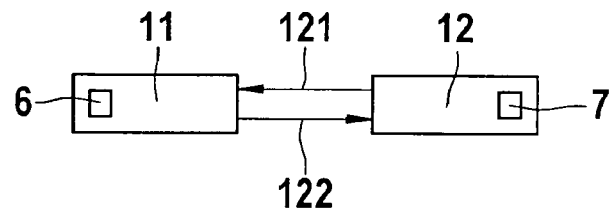
FIGS. 2a through 2c show program components of different versions which are connected to one another.
Figure 2B:
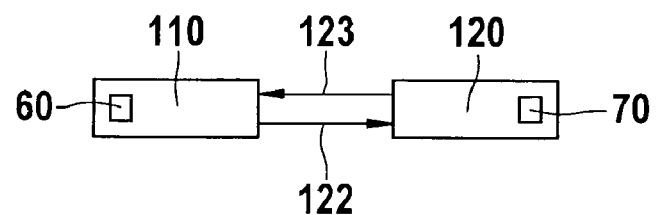
Figure 2C:
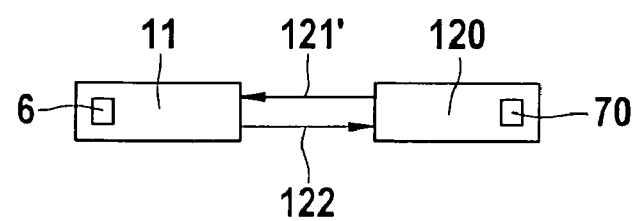

Different examples of an update of first and second program components 11, 12 are illustrated in FIGS. 2a, 2b, and 2c. The first program component and the second program component are connected to one another in FIG. 2a via first and second interfaces 121, 122. For this purpose, version identification number 1 is assigned to each of first and second program components 11, 12. First program component 11 has a version identification number list 6, in which all versions of the second program component which are compatible with the existing version of first program component 11 are stored. In the exemplary embodiment here, this is only version identification number 1 of the second program component. Second program component 12 also has a corresponding version identification number list 7, in which those version identification numbers of first program component 11 with which second program component 12 having version identification number 1 is compatible are stored. This is also only version identification number 1 here.

A newer version 110 of first program component 11 and a newer version 120 of second program component 12 are illustrated in FIG. 2b. The program components differ in that first interface 121 has been replaced by a newer interface 123. The two interfaces may differ, for example, in that, in relation to first interface 121, an additional parameter is provided by new first program component 110 for processing by new second program component 120. New first program component 110 thus receives version identification number 2, as does new second program component 120. Only version identification number 2 is contained in a version identification number list 60 of new first program component 110, while version identification numbers 1 and 2 are contained in version identification number list 70 of new second program component 120. If the attempt is now made, starting from the configuration according to FIG. 2b, to replace new second program component 120 with second program component 12 in the original embodiment, incompatibility is ascertained upon a comparison of the version identification number lists. This is because only version identification number 1 is present in the version identification number list of second program component 12, but new second program component 110 has version identification number 2. However, only version identification number 2 is also stored in version identification number list 60 of this new first program component 110. Since the particular other component may be found in neither of the two version identification number lists, an installation is aborted.

In contrast, if the attempt is made, starting from the configuration according to FIG. 2a, to replace second program component 12 with new second program component 120, this would be possible, since version identification number 1 is also present in its version identification number list 70. Thus, starting from the configuration in FIG. 2a, it would be possible to replace second program component 12 with new second program component 120. A corresponding configuration is shown in FIG. 2c. The interface of first component 11 to new second program component 120 is identified here with reference numeral 121'. This may be implemented, for example, in that the additional parameters which are not provided by first program component 11 are either set to a standard value or are ignored entirely. If necessary, it would also be possible to reach the configuration in FIG. 2c from the configuration in FIG. 2b. If necessary, a user may be warned even before the installation that a more recent version is to be replaced by an older version of a program component.

For a comparison, it is thus sufficient to compare the contents of version identification number lists 6, 60, 7, 70 to the version identification numbers of the particular other program component.

The compatibility comparison is preferably provided for devices in which the different program components are integrated into one large program package. However, it is also possible to correspondingly check the compatibility of programs on different processing units which are connected to one another and in which an installation is to be performed on at least one processing unit, for example.

In addition to a use for checking in the case of an end-user, it is also possible, however, to check the functionality of the system even during manufacturing by considering the installation method according to the present invention during the initial installation of software on a device and checking the compatibility with an operating system already present on the system in each case, for example.

What is claimed is:

1. A method for an installation of a first program component on a processing unit, comprising:
   obtaining a first list assigned to the first program component, the first list including at least one version number of a second program component that is already installed on the processor unit, wherein a particular version number is included in the first list only if a version of the second program component having the particular version number is compatible with a current version of the first program component;
   obtaining a second list assigned to the second program component, the second list including at least one version number of the first program component, wherein a particular version number is included in the second list only if a version of the first program component having the particular version number is compatible with a current version of the second program component;
   obtaining the current version numbers of the first and the second program components, wherein a new version number is assigned to a respective one of the first and the second program components whenever an interface configuration of the respective program component is changed;
   determining that the first program component is compatible with the second program component when at least one of the following conditions is determined to exist:
      the current version number of the first program component is included in the second list; and
      the current version number of the second program component is included in the first list; and
   performing an installation of the first program component only if the first program component is determined to be compatible with the second program component.

2. The method according to claim 1, wherein the first program component is installed to replace a program component already provided on the processing unit.

3. The method according to claim 1, wherein the second program component is an operating program of the processing unit and the first program component to be installed is an application program.

4. The method according to claim 1, further comprising outputting an error message in the event of an installation which is not performed because of a lack of compatibility.

5. The method according to claim 1, wherein the first program component is installed in a driver information system in a motor vehicle.

6. The method according to claim 5, wherein the driver information system is a navigation device.

7. The method according to claim 1, further comprising:
after the determining that the first program component is compatible with the second program component, and responsive to determining that the first program component must be compatible with an additional program component already installed on the processing unit, repeating each of the steps recited in claim 1 while substituting the additional program component for the second program component.

* * * * *